Aug. 8, 1950 — R. K. MEAD ET AL — 2,517,693
CABLE SEAL
Filed Nov. 3, 1945
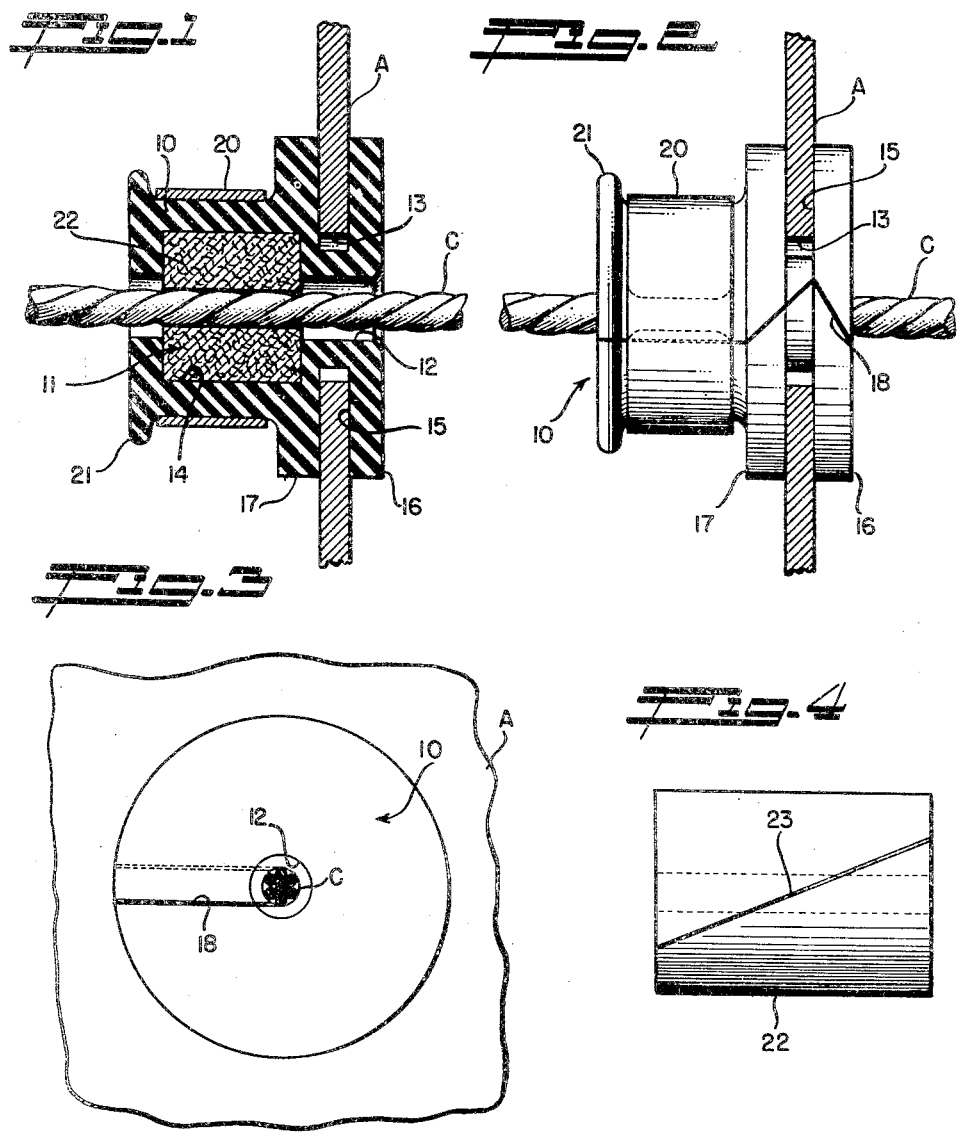
INVENTORS
RALPH K. MEAD
RAY T. ALEXANDER
By George C. Sullivan
Agent Patented Aug. 8, 1950

2,517,693

UNITED STATES PATENT OFFICE 2,517,693

CABLE SEAL

Ralph K. Mead, Glendale, and Ray T. Alexander, La Canada, Calif., assignors to Lockheed Aircraft Corporation, Burbank, Calif.

Application November 3, 1945, Serial No. 626,526

5 Claims. (Cl. 288—2)

This invention relates to sealing devices, and relates more particularly to devices for sealing about control cables and other movable control elements where they pass through pressure bulkheads, and the like.

In aircraft designed for high altitude flying it is now the common practice to pressurize the fuselage so that an internal air pressure condition may be maintained which is conducive to the comfort and well being of the passengers and crew. The control systems of aircraft usually embody cables which extend from the interior of the fuselage or flight compartment to the control elements. These cables pass through openings in the pressure bulkhead, and means must be provided to prevent the escape of the cabin air pressure from around the cables. It is important that an effective seal be maintained at each cable under the widely varying temperature conditions encountered during high altitude flight. Furthermore, it is important that the frictional resistance to cable movement offered by the sealing devices be kept at a minimum under all conditions of operation and flight so that the pilot has a full sense of "feel" in operating the controls.

It is a general object of this invention to provide a cable seal useful at a pressure bulkhead, or the like, that reduces air leakage to a minimum and that has low frictional resistance to cable movement. The cable seal of this invention keeps the air pressure leakage at an acceptable minimum when initially installed, as well as after extended service and while under a considerable pressure differential. The frictional resistance of the device remains low at temperatures of between 160° Fahrenheit and —65° Fahrenheit. The frictional resistance will usually be in the order of one-half pound per cable in average operation.

Another object of this invention is to provide a cable seal that is simple and compact, requiring a minimum of space at the bulkhead. The small compact sealing device of the invention does not interfere with the installation of pulleys in adjacent relation to the bulkhead or with the operation of cables over pulleys so positioned.

It is another object of the invention to provide cable seals that may be easily and quickly installed subsequent to rigging of the cables. The devices are in the nature of grommets cut or split to be readily engaged on previously rigged cables and then arranged in the openings of the pressure bulkhead. The cable admitting or passing slits are formed in the devices in such a manner that they are automatically closed against the leakage of air pressure when the devices are in the final installed positions.

A further object of the invention is to provide cable seals of the class mentioned which automatically adjust themselves to considerable amounts of angular and offset mis-alignment of the cable without undue air pressure leakage and without excessive wear.

Other objects and features of the invention will be readily understood from the following detailed description of a typical preferred form of the invention wherein reference will be made to the accompanying drawings in which:

Figure 1 is a longitudinal cross sectional view of a cable seal of the invention in the operative position on a bulkhead;

Figure 2 is a side elevation of the cable seal of Figure 1;

Figure 3 is an end view of the device of Figure 1; and

Figure 4 is an enlarged side elevation of the sealing member incorporated in the device.

The sealing devices of the present invention are capable of considerable variation to adapt them for specific installations. Furthermore, the devices may be constructed to seal about single cables or control elements or a plurality of such members. In the following detailed description we will describe a typical preferred form of the invention as employed to seal about conventional control cables, it being understood that the invention is not to be construed as limited or restricted to the particular details herein set forth.

In the drawings the grommet sealing device is adapted to be installed on a bulkhead A to seal about a single cable C and the device may be said to comprise generally, a grommet-like body 10 and means 11 in the body for sealing about the cable C.

The body 10 is a cylindrical or generally spool-shaped member of flexible resilient material. It is preferred to construct the body 10 of a synthetic rubber or rubber composition having a low thermal coefficient of expansion, and that retains its resiliency and flexibility throughout a wide range of temperatures. The body 10 is a one-piece tubular member having a longitudinal opening 12 which is considerably larger in diameter than the cable C so that the cable may pass through it without interference. The body 10 is of sufficient length to extend through an opening 13 in the bulkhead A and then project some distance from the inner or "pressure" side of the bulkhead. A chamber or cavity 14 is provided in the wall of the opening 12. It is preferred to form the cavity 14 in the inwardly projecting portion of the body 10. The cavity 14 is provided to receive the sealing means 11 to be subsequently described, and may be in the nature of a simple cylindrical enlargement of the opening 12.

The body 10 is constructed so that it may be readily installed in the opening 13 of the bulkhead A to have limited play or movement therein. This freedom of movement allows the device to adjust itself to considerable misalignment of the cable C while maintaining effective sealing engagement with both the bulkhead and the cable. The portion of the body 10 that is engaged with the bulkhead A is enlarged in external diameter to have what may be considered a radial flange. An external annular groove 15 is formed in this flange and divides the enlarged or flanged portion into two annular lips 16 and 17. The groove 15 is of substantial depth and the inner or bottom wall of the groove has a diameter considerably smaller than the diameter of the bulkhead opening 13. The annular space or clearance thus provided between the bottom wall of the groove 15 and the wall of the opening 16 allows the device to shift with respect to the bulkhead in conformance with angularity and mis-alignment of the cable seal. The side walls of the groove 15 are flat to engage the inner and outer surfaces of the bulkhead A, and the groove is proportioned so that these walls have sealing contact with the bulkhead surfaces.

In order to facilitate the installation of the device after rigging of the cable C, the body 10 is split longitudinally so that it may be sprung over the cable and then engaged in the bulkhead opening 13. The body 10 has a single longitudinal slit or cut 18 extending from one end to the other. This cut 18 is preferably made after the body 10 has been molded, and is such that its opposing walls may flatly engage and seal with one another when the device is in the operative condition. The slit or cut 18 is preferably tangent to the body opening 12 and may be straight and axial in the small diametered or unflanged portion of the body. In accordance with the invention, the cut 18 is zigzagged or chevron-like where it passes through the flange portion of the body 10. As best shown in Figure 2, the cut 18 has a pitched part extending through those portions of the body having the inner lip 18 and the groove 15, and has a second part pitched in the opposite direction and extending to the outer end of the body. The chevron-shaped portion of the cut 18 provides a chevron type seal for preventing axial leakage of air pressure. The internal air pressure urges the inner lip 17 against the bulkhead A to preserve a seal at this area and urges one side of the diagonal or pitched cut portion against the other side of the cut to maintain an air-tight seal at the cut. We have found that the chevron cut 18 assures an effective seal, even where a substantial pressure differential exists at the opposite sides of the bulkhead A.

A clip 20 is preferably provided on the body to prevent the body from spreading or opening up, and to assist in maintaining the packing or sealing means 11 in the operative condition, as will later become apparent. The clip 20 is adapted to substantially encircle the inner portion of the body 10, being in the form of a band having a circumference of slightly less than 360°. While we have shown a separate clip applied to the exterior of the body 10, it is to be understood that the clip may be molded in the body. A peripheral bead 21 may be provided on the inner end of the body 10 and the clip is engaged on the body between the bead and the inner flange or lip 17. It is preferred to construct the band or clip 20 of metal having substantial resiliency. In applying the clip 20 it is spread so that it may be passed over the inner end of the body and is then released to spring inwardly or contract onto the body. The resilient band 20 exerts a suitable inward force or compression to prevent spreading of the body and to hold the cut 18 closed. It is preferred to position the clip 20 so that its gap or open side is circumferentially offset from the cut 18.

The sealing or packing means 11 comprises a body or insert 22 of sealing material engaged in the above described cavity 14. It has been preferred to construct the insert 22 of felt, although other materials such as asbestos, sintered metal containing lubricant, cork, fibrous materials or combinations of the same, may be used. The insert 22 is a cylindrical tubular spool-like member proportioned to closely fit the cavity. The longitudinal opening of the felt insert 22 is of such diameter that the felt closely conforms to and seals with the cable C. To minimize friction and to prolong the life of the sealing insert 22, it is desirable to lubricate the felt. The lubricant for the felt sealing member 22, the lubricant applied to the cable, and the sealing lubricant applied to above mentioned lips 16 and 17 may be varied in accordance with the prevailing conditions of operation. The lubricants employed should be of a character that will not affect or injure the material of the body 10. It will be observed from Figure 1 that the felt sealing member 22 engages the cable C for a substantial distance to prevent direct contact of the cable with the body 10.

The felt insert or sealing member 22 is longitudinally split to allow the sealing grommet to be assembled on the bulkhead after the cable C has been rigged. A longitudinal cut or split 23 is provided in the felt insert 22. The split 23 extends throughout the length of the insert and extends from its periphery to its longitudinal opening. As shown in Figure 4, the split 23 is pitched or diagonal with respect to the longitudinal axis of the insert 22. This pitching of the split 23 precludes the possibility of the split falling into registration with the cut 18 in the body 10. With the device assembled in the operative position of Figure 1, the band or clip 20 assisted by the resiliency of the body 10 urges the felt member 22 inwardly against the cable C with a desirable pressure, and holds the slit 23 closed.

From the above detailed description it is believed that it will be apparent how the cable seals may be easily and quickly assembled at the bulkhead A to maintain substantially air-tight seals around previously rigged cables. The devices project a minimum distance from the bulkhead A and occupy only small areas at the bulkhead so that they do not interfere with the installation or operation of adjacent pulleys. The air pressure at the inner side of the bulkhead A holds the lip 17 in sealing engagement with the bulkhead to prevent leakage around the exterior of the device. The lubricated felt insert 22 maintains effective sealing contact with the cable C under varying pressure and temperature conditions. The sealing means offers a minimum of resistance to the movement of the cable and is long lived.

Having described only a typical form of the invention, we do not wish to be limited to the specific details herein set forth, but wish to reserve to ourselves any variations or modifications that may appear to those skilled in the art or fall within the scope of the following claims.

We claim:

1. A device for sealing about a cable or the like where it passes through an opening in a bulkhead comprising a body of elastic material having a flange portion adapted to be engaged in said opening in the bulkhead and having a longitudinal opening for receiving the cable, the body further having a longitudinal cut extending from one end to the other and extending from the exterior of the body to said opening for admitting the cable to the body opening, the portion of the cut which passes through said flange portion being of chevron shape, and a member of felt in the opening of the body for sealing with the cable.

2. A device for arrangement in an aperture in a support operable to seal about a member passing through the aperture, the device comprising a body of elastic material for arrangement in said aperture having a longitudinal opening for passing said member and having a longitudinal slot for admitting the member to the opening, there being a cavity in the wall of the opening, the body having an external groove for receiving the edge of the aperture in said support, and sealing material in the cavity for sealing with the member.

3. A device for arrangement in an aperture in a support operable to seal about a member passing through the aperture, the device comprising a body of elastic material having a longitudinal opening for passing said member and a longitudinal slot for admitting the member to the opening, there being a cavity in the wall of the opening, sealing material in the cavity for sealing with said member, and a clip engaged around the body to hold said slot closed and to maintain said material in contact with said member.

4. A device for arrangement in an aperture in a support operable to seal about a member passing through the aperture, the device comprising a body of elastic material to be arranged in said aperture having a longitudinal opening for passing said member and a longitudinal slot for admitting the member to the opening, there being a cavity in the wall of the opening, an external flange on the body having an annular groove receiving the edge portions of the aperture, a tubular sealing element in said cavity for sealing around said member, there being a slot in said element for admitting said member into the opening of the tubular element, and a clip engaged around the body to hold said slots closed and to maintain said element in contact with said member.

5. A device for arrangement in an aperture in a support operable to seal about a member passing through the aperture, the device comprising a body of elastic material having a longitudinal opening for passing said member and a longitudinal slot for admitting the member to the opening, there being a cavity in the wall of the opening, peripheral flanges on the body spaced apart by a groove which is adapted to receive the portions of the support surrounding said aperture so that the flanges may seal with the support, said slot being of chevron shape where it passes through said flanges and the portion of the body carrying the flanges, means in said cavity for sealing with the member, and a clip engaging around the body.

RALPH K. MEAD.
RAY T. ALEXANDER.

REFERENCES CITED

The following references are of record in the file of this patent:

UNITED STATES PATENTS

| Number | Name | Date |
| --- | --- | --- |
| 394,156 | Crandall | Dec. 11, 1888 |
| 1,287,285 | Gammeter | Dec. 10, 1918 |
| 1,336,030 | Gammeter | Apr. 6, 1920 |
| 1,697,814 | Forbes | Jan. 1, 1929 |
| 1,747,592 | Morlang | Feb. 18, 1930 |
| 1,800,578 | Webb | Apr. 14, 1931 |
| 1,801,995 | Bell | Apr. 21, 1931 |
| 1,875,936 | Saunders | Sept. 6, 1932 |
| 2,039,009 | Lampman et al. | Apr. 28, 1936 |
| 2,055,904 | Lindgren | Sept. 29, 1936 |